United States Patent [19]
Windeler et al.

[11] Patent Number: 5,121,148
[45] Date of Patent: Jun. 9, 1992

[54] SINGLE LENS REFLEX CAMERA

[75] Inventors: Stanley R. Windeler, Bloomfield Hills; Joseph G. Welmers, Birmingham, both of Mich.

[73] Assignee: Grant Engineering, Incorporated, Rochester, Mich.

[21] Appl. No.: 639,828

[22] Filed: Jan. 9, 1991

[51] Int. Cl.$^5$ .............................................. G03B 9/12
[52] U.S. Cl. ................................ 354/152; 354/173.1; 354/234.1
[58] Field of Search ............... 354/152, 173.1, 234.1

[56] References Cited

U.S. PATENT DOCUMENTS

| | | | |
|---|---|---|---|
| 4,139,302 | 2/1979 | Hung et al. | 356/32 |
| 4,392,745 | 7/1983 | Wright et al. | 356/348 |
| 4,720,718 | 1/1988 | Yamamoto et al. | 354/154 |
| 4,750,012 | 6/1988 | Lindenfelser | 354/152 |

Primary Examiner—Michael L. Gellner
Attorney, Agent, or Firm—Krass & Young

[57] ABSTRACT

A camera 14 has a shutter 42 that is reciprocally movable by a motor 54 that is in positive engagement with the shutter 42. The motor 54 provides harmonic motion to the shutter 42 between its open and closed positions. A second motor 78 advances the film within the camera body. Both motors are connected to electronic brakes 104,118 to stop the motors when they are deactuated. The shutter has a mirror 50 mounted therein to provide a viewing of the image beam by the lens 36 through an eyepiece 122 when the shutter 42 is closed.

16 Claims, 5 Drawing Sheets

SINGLE LENS REFLEX CAMERA

TECHNICAL FIELD

This invention relates to a camera and more particularly to a single lens reflex camera for performing coherent interferometric analysis of object surfaces.

BACKGROUND OF THE INVENTION

The development of a laser as a convenient source of light that is both temporarily and spatially coherent has given rise to a class of interferometric techniques for non-destructibly testing objects by interferometrically comparing their surfaces in a stressed and unstressed condition. For example, subsurface anomalies in pneumatic rubber vehicle tires may be detected by placing the tires in a pressure chamber and making an interferometric comparison of their surface contours or surface shear strains before and after a pressure change. Some subsurface separations resulting from improper manufacturing procedures in a pneumatic tire or deterioration experienced during its use will result in non-uniform deformation or changes in the shear strain of the tire surface as a result of the pressure change.

Interferometric inspection techniques employing single, double or multiple exposures of coherently illuminated surfaces to a photographic film forming an interferogram may also be employed for non-destructive testing. One technique has been commercialized under the trademark L-RAY ® or the term "SHEAROGRAPHY" as described in Hung et. al U.S. Pat. No. 4,139,302 issued on Feb. 13, 1979. The Hung et al reference discloses a double exposure surface analysis method not requiring a separate reference beam. In the method, light from a coherently illuminated surface passes through a special lens which focuses incoming light from the object to form two or more overlapping and interfering images. A camera stand that can adjustably mount a camera, within the bead diameter of a tire for use in conjunction with the L-RAY ® nondestructive testing method is disclosed in Wright et al U.S. Pat. No. 4,392,745 issued on Jul. 12, 1983.

In the past, it has been found that a typical optical camera lasts approximately 100,000 cycles. The 100,000 cycles provide for a lifetime of use by an average amateur photographer. Most professional photographers use a camera a relatively long time between repairs because they commonly use a plurality of cameras, each with a different lens, to eliminate the time needed to change lenses between shots.

The above-identified interferometric testing methods have been successfully used on a commercial basis. A tire or other tested object is placed in a light tight pressure chamber. A pulse of light emanates from a laser when the shutter is opened to expose the film. The chamber is pressurized and a second pulse of light double exposes the film. The camera or the test object is adjusted to a different position to test a different portion of the tested object. The shutter may be cycled opened and closed for each pulse of light. A camera used in the described interferometric systems often can undergo over one million (1,000,000) cycles a year. The prior art cameras thus would have to be repaired, on the average, 10 times a year. It has been found that most of the needed repairs are due to the inherent nature of the shutter action of a standard camera. The shutter of standard cameras are spring loaded such that upon actuation of the camera, the shutter flies across the aperture and slams to its closed position. The abrupt starts and stops of the shutter shake or vibrate the camera apart over the many cycles it encounters.

What is needed for interferometric analysis is a camera having a shutter that is positively driven between the opening and closing motion and that is buffered when it approaches its open and closed positions.

SUMMARY OF THE INVENTION

In accordance with one aspect of the invention, a shutter for a camera is reciprocally and harmonically driven between a closed position and an open position with respect to an aperture in the camera. In one embodiment a motor drives the shutter between its open and closed positions. The shutter prevents light from impinging on light sensitive material, for example photographic material, when the shutter is in the closed position and allows light from the aperture to impinge on the photographic material when the shutter is in the open position. The camera body has a mounting means for mounting the light sensitive photograph material for recording an image from the light that has passed through the aperture.

Preferably, the photographic material is a roll of photographic film. The film is exposed one frame at a time via the shutter and aperture. A second motor positively advances the film one frame at a time so that multiple exposures can be made on the roll of film. The roll of film can be mounted in a cartridge format for ease of loading and unloading into and out of the camera.

Controls for actuating and deactuating the shutter motor include limit switches axially spaced along the path of motion of the shutter such that the shutter actuates each switch to stop the motor. A pulse counter is operably mounted to a rotatable shaft which moves when the film is advanced by the second motor. A magnet having a plurality of spaced north and south poles passes by the pulse counter to create pulses. The pulse counter is commonly referred to as a Hall effect switch. A microprocessor control counts the pulses. At a predetermined number of pulses which correspond to the length of one frame of film being moved past the aperture, the microprocessor deactuates the second motor. Dynamic electronic brakes slow down both motors to a stop when the motors are deactuated.

In one embodiment, the shutter translationally moves in harmonic fashion within a tubular section of the camera body and a reflex mirror is fixedly attached to the shutter. A viewing window is formed at the axial end of the tubular section to view reflected light from the reflex mirror. Preferably the shutter is constructed to form an enclosure which mounts the reflex mirror at an angle with respect to the aperture and viewing window. The shutter has an inlet and an outlet to provide for the passage of light from the aperture to the viewing window when the shutter is in the closed position. The mirror, being fixed to the shutter, moves away from the aperture when the shutter is opened. The tubular section has a frame window aligned behind the aperture. The frame of film to be exposed is aligned directly behind the frame window.

The motors have rotors which rotate in one direction only. The motor that drives the shutter is connected via reducing gears to a rotatable crank arm which has a length such that it can rotate about its pivot point and not hit a wall of the tubular section. The crank arm rotates and is connected to a coupler link which pulls and pushes the shutter in a translational movement axially along the interior of the tubular section.

The orbital motion of the crank arm produces a harmonic motion of the shutter along its axis of travel. Two positions of the crank arm 180° apart from each other correspond to the respective closed and open positions of the shutter. At these two positions of the crank arm, a predetermined amount of rotation of the crank arm provides the least amount of translational motion of the shutter. The open and closed positions correspond to the two end limit positions of the shutter's travel. The limit switches are axially spaced from each other such that they are respectively actuated when the shutter is approximately at its open and closed positions.

In accordance with another aspect of the invention, a motor is operably engaged to the shutter to positively drive it between its closed and open position.

In accordance with another aspect of the invention, a reflex mirror is fixedly connected to the camera shutter. The mirror is in position to reflect light entering the lens to a view screen. The shutter and mirror assembly is preferably connected to a geared drive mechanism such that when the drive mechanism is deactuated, the shutter and mirror are locked with respect to the camera housing.

In this fashion, a camera suitable for strobe interferometric imaging provides for a moving shutter which is positively driven in a harmonic fashion. The motor driving the shutter has an electronic brake that slows the motor to a stop when the motor is deactuated at a point where the shutter has the smallest amount of motion per rotation angle of the rotor of the motor. Similarly, the sequential actuation of the drive motor is at a point where the shutter has the smallest motion per rotational angle of the rotor. The harmonic drive of the shutter and the braking process of the motor provides for a shutter that does not have any severe or abrupt starts or stops either during its actuation or deactation to provide a reliable apparatus with a great number of repair free cycles.

BRIEF DESCRIPTION OF THE DRAWINGS

Reference now is made to the accompanying drawings in which.

DETAILED DESCRIPTION OF THE PREFERRED EMBODIMENT

Figure 1:
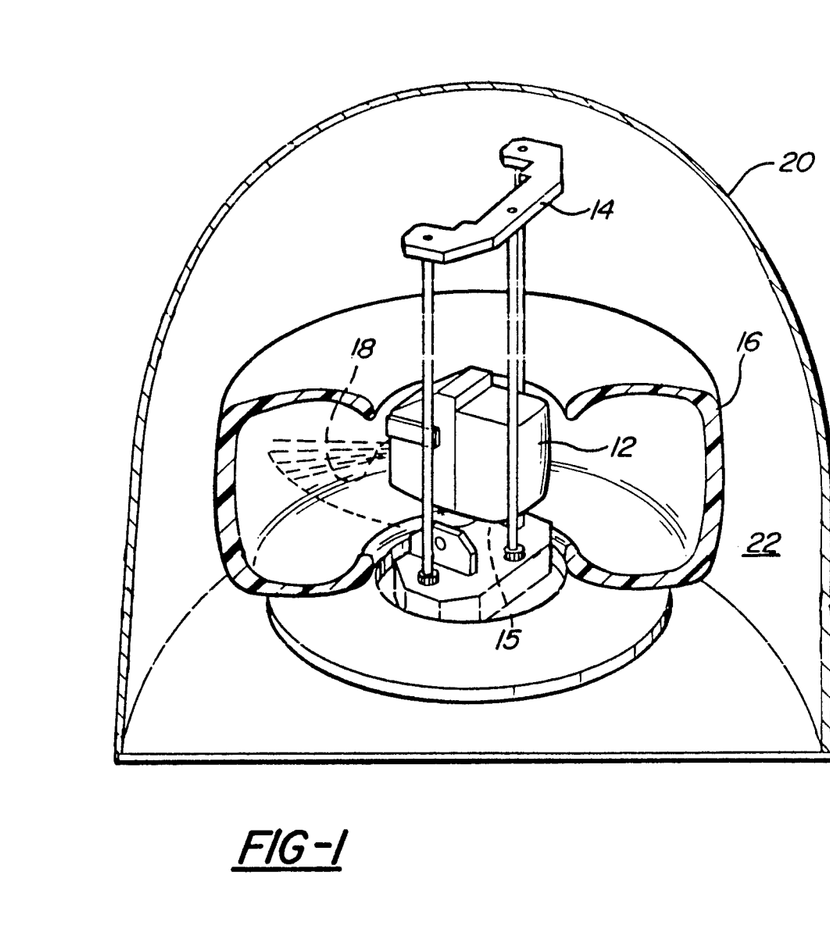
FIG. 1 is a perspective and partially segmented view of an apparatus for forming a multiple exposure interferogram of a coherently illuminated object surface when different stresses are exerted on the object.
Figure 2:
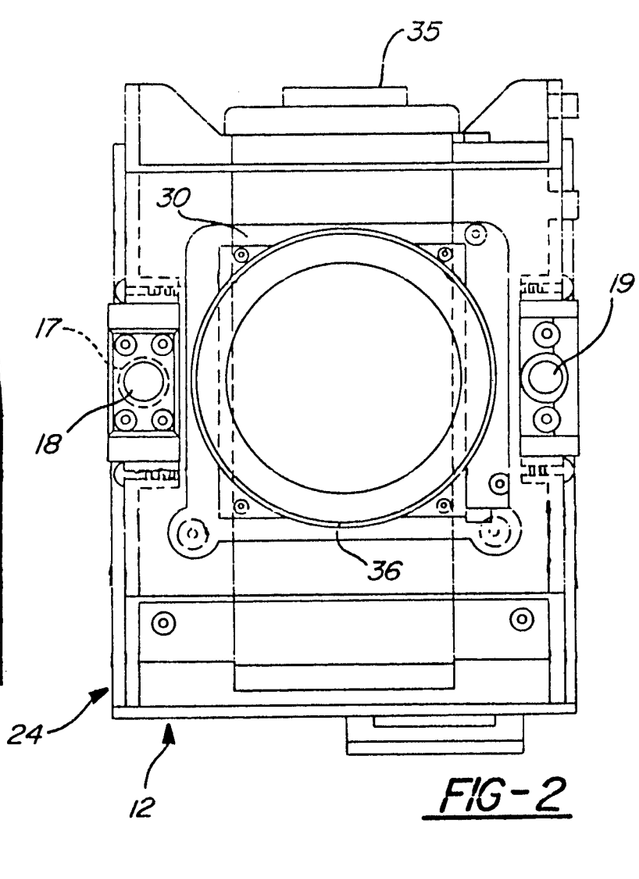
FIG. 2 is a front elevational view of the camera shown in FIG. 1.

As illustrated in FIG. 1, the preferred embodiment of the camera 12 is mounted on a camera stand 14 to perform interferometric analysis of the vehicle tire 16 by double or multiple exposure within a chamber 22 formed by an optical dome 20 and illuminated by a light source 15 such as a laser. A stress is applied to the tire during the subsequent exposure for interferometric analysis. The stress can be introduced by increasing or reducing the air pressure within the dome chamber 22.

The camera 12 is shown in more detail in FIGS. 2-9. The camera 12 has a body 24 defined by a film holding section 26, motor section 28 and tubular section 30. The tubular section 30 has an aperture 32 at its front wall 34 which can mount a lens assembly 36 via conventional bayonet or screw-on mount 38. A beam diffusion element 18 is mounted on the front end of a light porthole 17 to diffuse light from the laser 15 in front of the lens assembly 36. The laser 15 can be remotely mounted on or in the base of stand 14. Alternatively, the laser 15 may be mounted at porthole 17 to provide light directly to diffuser 18. A photocell 19 can also be mounted on the front end of camera 12 to monitor light level to help achieve proper exposure. The lens assembly 36 is preferably a shear type lens assembly such as the commercially available L-RAY ® 16 mm lens. The back wall 39 of the tubular section 30 has a frame window 41 leading to the film holding section 26.

Figure 5:
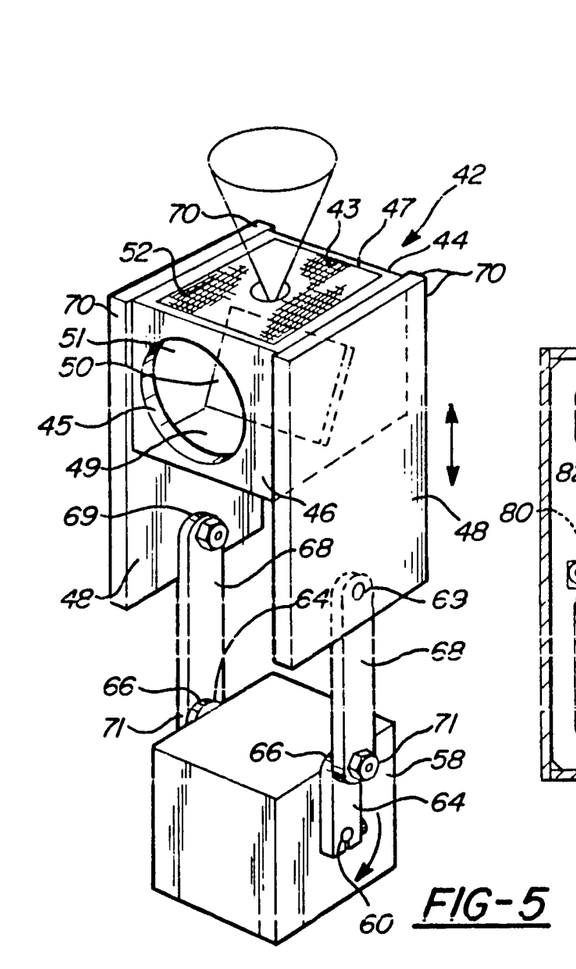
FIG. 5 is a perspective view of the shutter assembly.
Figure 6:
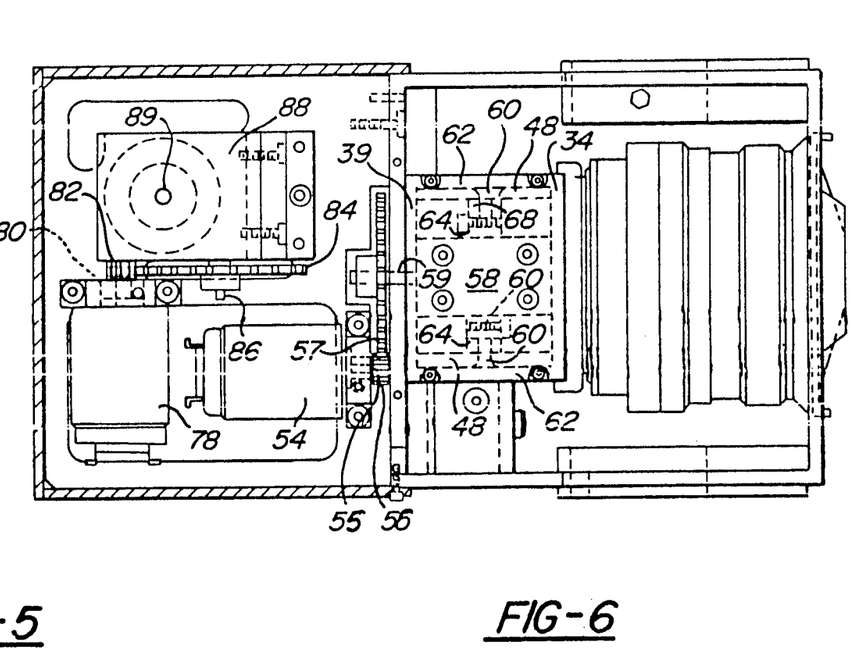
FIG. 6 is a bottom plan and partially segmented view of the camera.
Figure 7:
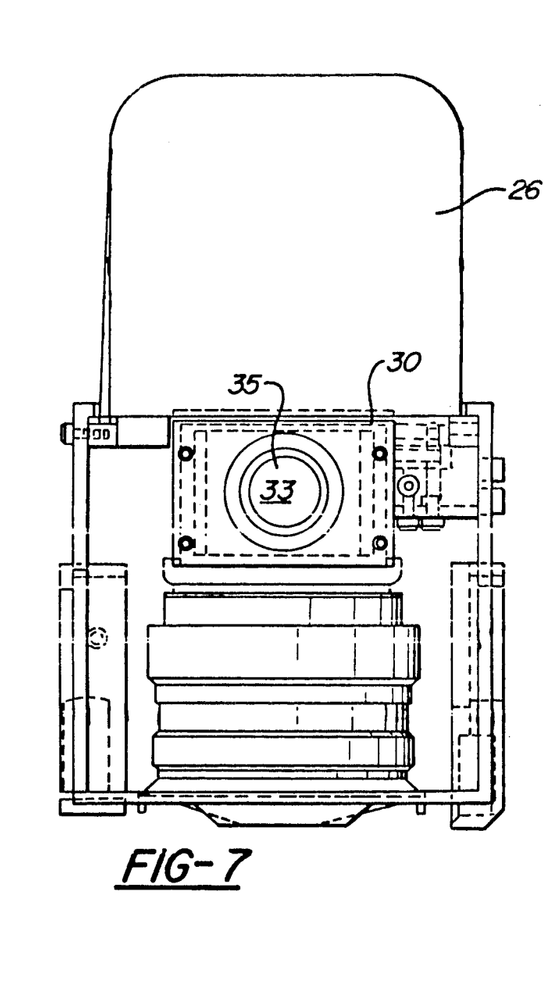
FIG. 7 is a top plan view of the camera.

A shutter assembly 42 is reciprocally and slidably movable within tubular section 30. The shutter assembly 42 includes a back wall 44, a front wall 46, two side walls 48, bottom wall 49 and top wall 47. Front wall 46 has an inlet 45 therethrough and top wall 47 has an outlet 43 therethrough. A mirror 50 is mounted in the enclosure 51 formed by the walls 44, 46, 47, 48 and 49. The mirror 50 is mounted to the two side walls 48 at a 45° angle with respect to both the inlet 45 and outlet 43 such that light from the inlet 45 is reflected by the mirror to pass through the outlet 43 to be viewed from eyepiece 35 mounted in opening 40 at axial end 33 of tubular section 30. Outlet 43 has a viewing screen 52 positioned across opening 43.

Figure 3:
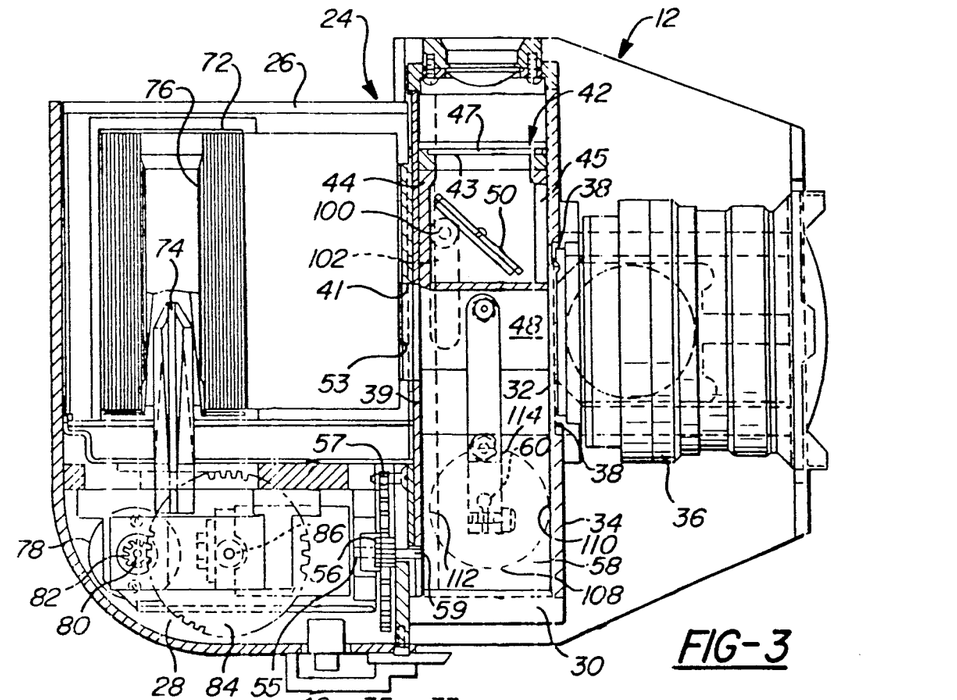
FIG. 3 is a side elevational and partially segmented view of the camera shown in FIG. 2.
Figure 4:
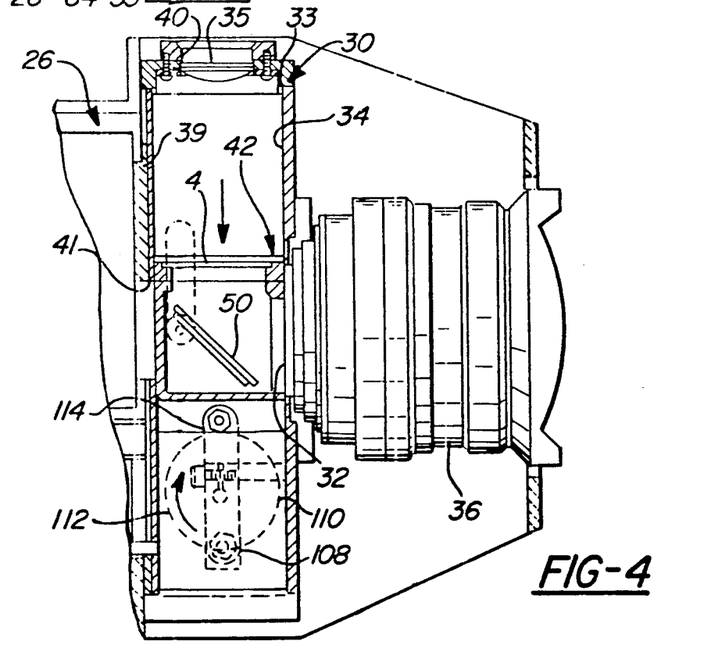
FIG. 4 is a fragmentary view similar to FIG. 3 with the shutter moved to the closed position.

The shutter assembly 42 is slidably mounted in tubular section 30 between an open position shown in FIG. 3 and a closed position shown in FIG. 4. The closed position shown in FIG. 4 covers aperture 32 and frame window 41. The motion of the shutter 42 between the open and closed positions is in the same plane as the plane of aperture 32. In the open position, both the frame window 41 and aperture 32 are open such that light can pass through lens assembly 36, through aperture 32, and through frame window 41 to expose a portion of film 53.

The drive mechanism that moves the shutter assembly 42 between the open and closed position includes an electric motor 54 that has a stator (not shown) and a rotor 55 connected to a drive gear 56. The drive gear 56 is in constant engagement to a large driven gear 57 to produce a gear reduction. The driven gear 57 is connected to the input shaft 59 of a gear assembly 58. Gear assembly 58 has an input shaft 59 and two output shafts 60. The gear assembly 58 is a black box component that can be bought commercially. One such gear assembly is a worm-type drive available from SD Products Company. The two output shafts 60 are aligned and extend toward two opposing side walls 62 of the tubular section 30.

A crank arm 64 is fixedly attached to each output shaft 60 to be rotatable therewith. The arm 64 is short enough to rotate within the tubular section between the back wall 39 and front wall 34 which includes aperture 32. Each crank arm 64 has a distal end 66 pivotally connected to a respective follower linkage 68 at end 71. Each linkage 68 has its other end 69 pivotably attached to the two side walls 48 below bottom wall 49. The side walls 48 are spaced apart to abut side walls 62 of tubular section 30. The two side walls 48 also have shoulder sections 70 which extend behind and in front of the back wall 44 and front wall 46 respectively. The shoulder sections 70 of walls 48 abut the walls 34 and 39 of the tubular section 30 to provide a sliding motion of the shutter 42 with no fore and aft or sideways wobble The side walls 48 are made from Delrin TM acetal resin to provide for a low friction motion against the tubular section 30.

The film holding section 26 can be adapted to fit a film cartridge 72 for film widths up to 70 mm. The film cartridge 72 can be a commercially available Hasselblad 70 mm cartridge. A drive pin 74 protrudes into the film holding section 26 and is sized to be engageably received within the take-up spool 76 of the film cartridge 72 for driving it as the film is advanced. The film cartridge 72 is adapted to provide for a section of film 53 against the frame window 41.

The drive pin 74 is driven by an electric motor 78 which is similar to electric motor 54. Motor 78 has a stator (not shown) and a rotatable rotor 80 fixedly connected to a drive gear 82 which is meshed to a large gear 84 that in turn is connected to an input shaft 86 of a gear assembly 88. The gear assembly 88 has an output shaft 89 fixedly connected to the drive pin 74. Gear assembly 88 can be identical to gear assembly 58.

The motors 54 and 78, drive gears 56 and 82, driven gears 57 and 84, and gear assembly 88 are mounted within the motor section 28. Both motors 54 and 78 operate in one direction only such that its rotors 55 and 80 rotate in a single direction, stop at the end of a cycle, and when actuated again resume in the same direction. The motor 54 through the drive gear 56, driven gear 57 and gear assembly 58 linearly and reciprocally move the shutter up and down between the open and closed position. The linkage 68 converts the rotational motion of the driving crank arm 64 to the linear and reciprocal up and down motion of the shutter assembly 42. Secondly, the crank arm rotation is converted into harmonic motion of the shutter 42 wherein the shutter 42 slows down and comes to a stop in a harmonic fashion at its closed position and open position which correspond to position 108 and 114 for crank arm 64. The fastest translational motion of the shutter 42 is at a mid-point therebetween which correspond to positions 110 and 112 of crank arm 64.

Figures 8, 10:
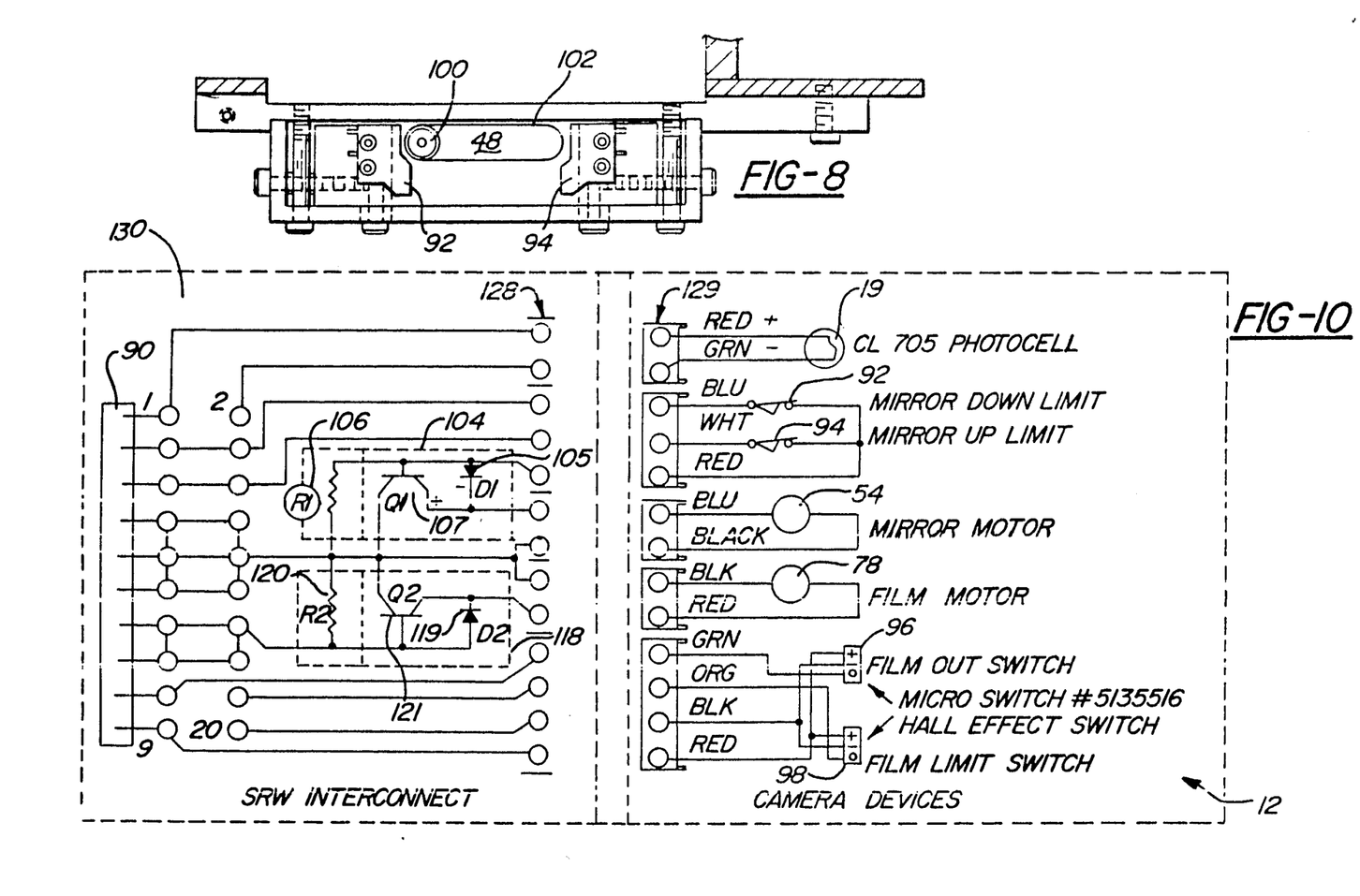
FIG. 8 is a fragmentary view illustrating the limit switches.
FIG. 10 is a schematic view of the electrical circuitry for the camera.

Both motors are initiated by a microprocessor 90 as shown in FIG. 10. Switches 92 and 94 initiate the deactuation of the shutter motor 54. As shown in FIGS. 3 and 8, side wall 48 of shutter 42 has a pin 100 which extends through an axially extending slot 102 in tubular section 30. The pin 100 is moved to either end of slot 102 which corresponds to the closed or open position of shutter assembly 42. The limit switches 92 and 94 are positioned as shown in FIGS. 3 and 8 at each end of the axially extending slot 102 and are respectively engaged by pin 100. When either switch 92 or 94 is engaged, power is interrupted from shutter motor 54. The rotor 55 is still rotating within the motor 54 and the motor 54 temporarily converts into a generator. In order to bring the rotor 55 to a stop, a dynamic braking device 104 allows the electrical power generated by the motor 54 to be dissipated and brings the motor 54 to a halt. The braking device 104 includes a resistor 106, a transistor 107 and a diode 105 electrically connected as schematically illustrated in FIG. 10. In this way, the rotor 55 is electronically stopped without an abrupt mechanical stress exerted on the motor 54.

The switches 92 and 94 function to deactivate the motor 54 when the shutter is in the respective closed and open positions. The position of the crank arm 64 with respect to the shutter allows for some manufacturing tolerances with respect to the position of the switches 92 and 94. If the switches 92 and 94 are axially out of position a slight amount, the crank arm position may be rotated slightly from the position as illustrated by numerals 108 or 114 in FIG. 4. However, because of the circular motion of the crank arm, the shutter movement is relatively small during the change of angle near positions 108 and 114 and will still be functionally in the respective closed or open position.

The switches 92 and 94 reset automatically when pin 100 disengages therefrom. If desired, the switches 92 and 94 can be replaced by a switch assembly that allows the microprocessor to provide a delay cut-off of power once the switches are engaged by pin 100.

The use of a worm-type gearing in gear assembly 58 prevents the mass of the shutter assembly 42 from non-motorized translation within tube 30, regardless of orientation of the camera 12. In other words, when the motor 54 is deactuated, the shutter assembly 42 with reflex mirror 50 is effectively locked in place with respect to the tube 30.

Figure 9:
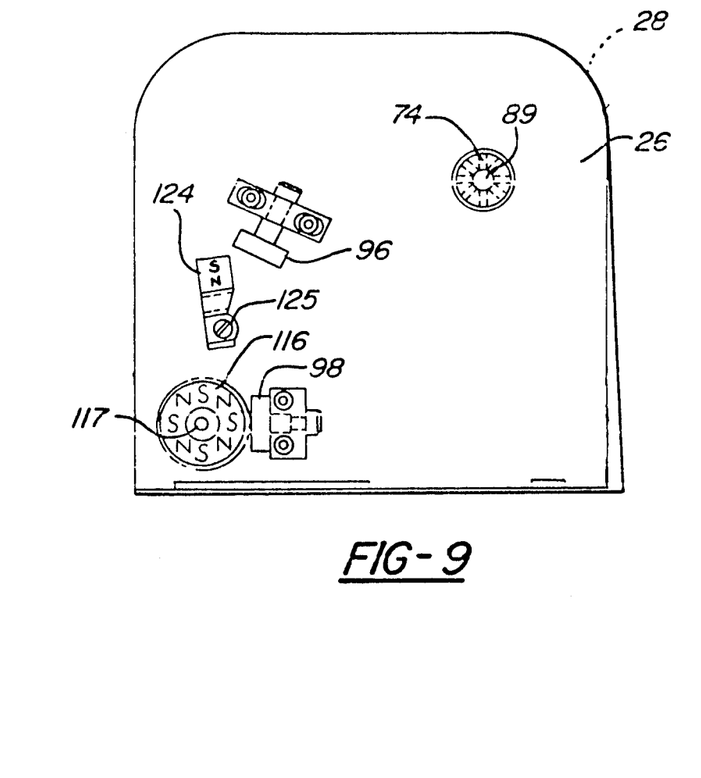
FIG. 9 is a view of a bottom wall of the film holding section of the camera illustrating the pulse counter and film-out switch.

The microprocessor 90 in conjunction with two Hall effect switches 96 and 98 control the motion of the film motor 78. As shown in FIG. 9, Hall effect switch 98 detects changes in its ambient magnetic field due to the rotation of a magnetized disc 116 having a plurality of north and south magnetic poles. Disc 116 is rotatably mounted in section 26 about point 117 and is operably connected to an existing rotatable shaft (not shown) in the film cartridge 72 when it is loaded in camera section 26. As the film 53 is advanced the disc 116 rotates. The microprocessor 90 deactuates the motor 78 after a particular number of pulses created by the rotation of disc 116 is detected by Hall effect switch 98. The rotor 80 continues to spin and temporarily converts motor 78 into a generator after power is cut off to the motor 78. A dynamic brake 118 allows the electrical energy generated by the motor 78 to be dissipated and brings the motor 78 to a halt. The brake device 118 is similar to braking device 104 and includes a resistor 120, a transistor 121, and diode 119. The motor 78 is stopped electronically without an abrupt mechanical impact. The use of worm-type gearing in gear assembly 88 prevents motion of the drive pin 74 when the motor 78 is off. Hence, the pin 74 effectively locks the wound film in place and the film behind frame window 41 is held stationary.

A film-out Hall effect switch 96 is also mounted in film section 26. The film switch 98 is triggered by a magnet 124 pivotably connected to camera section 26 at point 125 and held away from switch 196 by the film 53. If the film 53 runs out, the magnet 124 pivots toward switch 96 which detects the S pole and triggers the microprocessor 90 to cease further cycles. When the camera is unloaded and reloaded, the film limit switch 98 is reset to zero and the magnet 124 is moved back to the position shown in FIG. 9.

As shown in FIG. 4, when the shutter assembly 42 is in the closed position, the image formed by the lens is reflected by the mirror 50 to be focused on screen 52. Screen 52 is positioned to be in an equivalent position as the film 53 in the frame window 41 such that a view through the eyepiece 35 at the end 33 of tubular section 30 is equivalent to what the film 53 sees through the lens assembly 36.

As shown in FIG. 10, the electronic dynamic brakes 104, 18 are incorporated on an interconnect 130 between the camera body 12 and microprocessor 90. The terminals 128 are in contact with respective terminals 129 on camera 12 when the camera 12 is operational.

In operation, one loads the film within the camera in a conventional manner. The camera 12 is mounted on stand 14 and adjusted. The operator views the scene through eyepiece 35 during the adjustment. After proper adjustment and focusing of lens 36, the dome 20 is positioned over the assembly to block out any stray light. When the dome 20 is closed and the chamber 22 is sealed from light, the camera is actuated which turns on the motor 54 to move the shutter from the closed position shown in FIG. 4 to the open position in FIG. 3 until the switch 94 is engaged and the motor 54 is deactuated. The microprocessor 90 then triggers the light source 15. The pulse of light from the laser 15 passes through diffuser element 18, reflects off of tire 16, and enters through the lens assembly through aperture 32 and into the camera 12 to impinge on film 53. The motor 54 is reactuated to close the shutter 42. After the shutter 42 is closed, the film motor 78 is actuated to advance the film 53 one frame. After advancement of one frame, microprocessor 90 deactuates the film motor 78. The camera is ready for the next cycle.

In this fashion, neither the motors 54 and 78 nor the shutter assembly 42 encounter any high impact stresses often found in conventional cameras. The shutter assembly follows harmonic motion between its open and closed position to provide for a gentle closing and a gentle opening of the shutter assembly. The motors are electronically braked to similarly provide for low impact deactuation of the motors.

The camera by having the mirror fixed to the shutter eliminates parts and pivots that other conventional cameras need to move the mirror when the shutter opens. Furthermore, the mirror by being fixed to the shutter and the shutter being locked against motion provides a locked mirror to provide a stable image on the eyepiece.

The camera is used substantially the same as a reflex camera. One looks in the eyepiece to determine the proper position and focuses the camera at which time the camera is positioned within the dome and its cycles are remotely controlled.

The low impact nature of the motion of the parts within the camera provide for a highly reliable camera that needs fewer rebuilds and repairs as compared to conventional cameras. When repairs are needed, the structure of the camera provides for easy repairs without the need for special training or tools.

Variations and modifications of the present invention are possible without departing from its spirit and scope as defined by the appended claims.

The embodiments in which an exclusive property or privilege is claimed are defined as follows:

1. A camera characterized by:
  a body with a first aperture therein for letting light therethrough and including a viewing opening;
  means in said body for mounting light sensitive means for recording an image from said light passing through said first aperture;
  a shutter reciprocally movable between a closed position and open position with respect to said first aperture for preventing light from impinging on said light sensitive means when in the closed position and allowing light from said first aperture to impinge on said light sensitive means when in the open position;
  a first motor means for positively driving said shutter between said open and closed position including a rotor rotatable in one direction when said first motor means is actuated;
  gear means for converting said rotatable movement of said rotor into reciprocating linear movement of said shutter;
  a mirror fixedly mounted to said shutter for reflecting light from said aperture to said viewing opening when said shutter is in the closed position;
  said camera body including a tubular section slidably receiving said shutter for reciprocal axial movement therein;
  said tubular section having said first aperture of said camera in a wall thereof and a second aperture defining a frame window in an opposing wall aligned with said first aperture of said camera body;
  said light sensitive means being mounted at said second aperture;
  said viewing opening being located at an axial end of said tubular member;
  control means for actuating and deactuating said motor means;
  said control means including a first and second limit switch axially spaced and mounted along said tubular section;
  said first switch being activated when said shutter is approximately in said closed position;
  said second switch being activated when said shutter is approximately in said open position; and
  said limit switches being operably connected to said motor means to deactuate said motor means when engaged.

2. A camera as defined in claim 1 further characterized by:
  said shutter constructed to form an enclosure with an inlet and an outlet;
  said mirror being affixed in said enclosure of said shutter to reflect light from said aperture passing into said inlet and out through said outlet and to said viewing opening of said camera body.

3. A camera as defined in claim 1 further characterized by:
  said motor means operably connected to a dynamic electrical braking means for stopping a spinning rotor of said motor means after said motor means is deactuated.

4. A camera as defined in claim 3 further characterized by:
  said gear means converts said rotatable motion of said rotor into reciprocating harmonic linear movement of said shutter such that said motion of said shutter slows down near the linear limits of its linear movement and has faster motion at a midpoint therebetween.

5. A camera as defined in claim 4 further characterized by:
said gearing means constructed to prevent unintended motion of said shutter and mirror when said motor is deactuated.

6. A camera as defined in claim 1 further characterized by:
said gear means converts said rotatable motion of said rotor into reciprocating harmonic linear movement of said shutter such that said motion of said shutter slows down near the linear limits of its linear movement and has faster motion at a midpoint therebetween.

7. A camera as defined in claim 1 further characterized by:
said gearing means constructed to prevent unintended motion of said shutter when said motor is deactuated.

8. A camera characterized by:
a body with a first aperture therein for letting light therethrough;
means in said body for mounting a roll of film for recording an image from said light passing through said first aperture;
a shutter reciprocally movable between a closed position and open position with respect to said first aperture for preventing light from impinging on said light sensitive means when in the closed position and allowing light from said first aperture to impinge on said light sensitive means when in the open position;
a first motor means for positively driving said shutter between said open and closed positions;
control means for actuating and deactuating said motor means;
a second motor means for positively driving said film across said aperture a predetermined distance for each open cycle of said first motor means;
said control means actuates and deactuates said second motor means;
each of said motor means includes a rotor rotatable in one direction;
each motor means operably connected to an electronic braking means for stopping said spinning rotors after said motor means are deactuated.

9. A camera as defined in claim 8 further characterized by:
said first motor means includes a rotor rotatable in one direction when said first motor means is actuated;
gear means for converting said rotatable movement of said rotor into reciprocating linear movement of said shutter.

10. A camera as defined in claim 9 further characterized by:
said gear means converts said rotatable motion of said rotor into reciprocating harmonic linear movement of said shutter such that said motion of said shutter slows down near the linear limits of its linear movement and has faster motion at a midpoint therebetween.

11. A camera characterized by:
a body with an aperture for letting light therethrough;
mounting means in said body for mounting a roll of light sensitive film for recording an image from light passing through said aperture onto a frame of film aligned with said aperture;
a shutter reciprocally movable between a closed position and open position with respect to said aperture for preventing light from impinging on said film when in the closed position and for allowing light to impinge on a frame of said film aligned with said aperture when in the open position;
a first motor means for positively diving said shutter between said open and closed position;
a second motor means for advancing said film;
control means for actuating and deactuating said first motor means when said shutter is in said open and closed positions and for actuating and deactuating said second motor means for sequentially advancing said film roll;
each of said motor means including a rotor rotatably in one direction;
each motor means operably connected to an electronic braking means for stopping spinning rotors of said motor means after said motor means are deactuated.

12. A camera as defined in claim 11 further characterized by:
said shutter linearly movable between said closed and open position along an axis of travel substantially coplanar with the plane of said aperture;
said control means including a first and second limit switch axially spaced along said axis of travel such that said first limit switch being activated when said shutter is approximately in said closed position and said second limit switch being activated when said shutter is approximately in said open position to deactuate said first motor means.

13. A camera as defined in claim 11 further characterized by:
said control means includes a pulse counter that is operable when said second motor means advances said film;
said control means, pulse counter and film is coordinated such that said control means counts the pulses from said pulse counter and deactuates said motor after said film is advanced one frame.

14. A camera as defined in claim 11 further characterized by:
a gear means operably interposed between said first motor means and said shutter and being constructed to prevent unintended motion of said shutter when said first motor means is off.

15. A camera as defined in claim 11 further characterized:
a gear means operably interposed between said second motor means and said film and being constructed to prevent unintended motion of said film when said second motion means is off.

16. A camera as defined in claim 11 further characterized by:
a gear means operably interposed between said first motor means and said shutter and being constructed to prevent unintended motion of said shutter when said first motor means is off.

* * * * *